(No Model.)
E. A. SCRIBNER.
ELECTRIC INCANDESCENT LAMP.
No. 254,780. Patented Mar. 7, 1882.
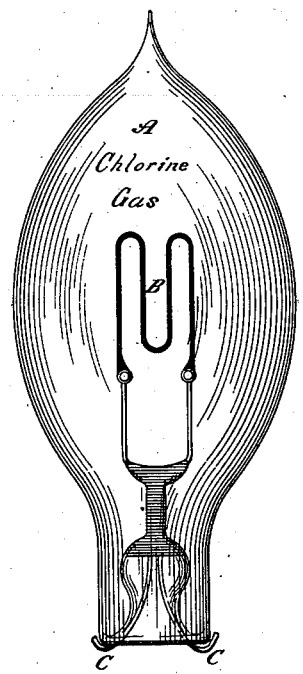
Attest:
R. F. Barnes
W. Frisby
Inventor:
Edwin A. Scribner
by his Attorney,
Parker W. Page.

UNITED STATES PATENT OFFICE.

EDWIN A. SCRIBNER, OF NEWARK, NEW JERSEY, ASSIGNOR TO THE UNITED STATES ELECTRIC LIGHTING COMPANY, OF NEW YORK, N. Y.

ELECTRIC INCANDESCENT LAMP.

SPECIFICATION forming part of Letters Patent No. 254,780, dated March 7, 1882.

Application filed January 26, 1882. (No model.)

*To all whom it may concern:*

Be it known that I, EDWIN A. SCRIBNER, a citizen of the United States, and resident of Newark, in the county of Essex and State of New Jersey, have invented certain new and useful Improvements in Electric Incandescent Lamps, of which the following is a specification.

When electric lamps containing a stem of carbon in a vacuum-receiver are rendered incandescent it is found that the interior surface of the globe becomes clouded by a thin deposit, which disfigures the lamp and intercepts a great part of its light. I have found that under certain conditions the presence within the globe of chlorine effectually prevents this clouding, this being probably due to a chemical combination, under very high temperatures, of chlorine and carbon protoxide, resulting in the formation of a vapor or liquid rather than a solid deposit. The conditions under which this result is best attained are that the globe should contain no atmospheric air and only a very small quantity of chlorine, and in order to obtain these conditions at least approximately the following is the method pursued.

It is usual to attach a number of lamps to the same exhaust apparatus and to exhaust them simultaneously. To the same apparatus, and in direct communication with the lamps, a small retort capable of being filled with pure chlorine gas is also attached, and provided with a stop-cock, by which communication with the lamps may be shut off. This retort being filled with chlorine and disconnected from the lamps, the latter are exhausted of air as completely as possible, when the stop-cock is opened and the gas allowed to enter the lamps. By the diffusion of the gas the lamps become filled with an attenuated atmosphere of chlorine, and in this condition they are tested and sealed.

Instead of this method, others may be employed, if so desired—for instance, a similar method to that usually followed in the manufacture of lamps containing a rarefied hydrocarbon vapor.

Annexed hereto is a drawing illustrating, for purposes of reference, an electric lamp of a common type, consisting of a glass globe, A, a carbon conductor, B, and metallic wires C.

To the special means of introducing the chlorine or to the specific character of the lamp itself I do not, however, lay claim; but What I desire to secure by Letters Patent is—

1. An electric incandescent lamp containing a rarefied atmosphere of chlorine.

2. In an electric lamp, a carbon conductor adapted to be rendered incandescent, in combination with an inclosing-globe containing a rarefied atmosphere of chlorine, substantially as described.

In testimony whereof I have hereunto set my hand this 12th day of December, 1881.

EDWIN A. SCRIBNER.

Witnesses:
W. FRISBY,
PARKER W. PAGE.